(12) United States Patent
Park et al.

(10) Patent No.: US 7,145,953 B2
(45) Date of Patent: Dec. 5, 2006

(54) FILTERING METHOD AND APPARATUS FOR REMOVING BLOCKING ARTIFACTS AND/OR RINGING NOISE

(76) Inventors: Jeong-hoon Park, 110-1606 Donga Apt., Bongcheon 2-dong, Gwanak-gu, Seoul (KR) 151-052; Yong-je Kim, 503-10 Samsung 5-cha Apt., Jinsan Maeul, Bejeong-ri, Guseong-myeon, Yongin-si, Gyeonggi-do (KR) 449-913; Yung-lyul Lee, 1-704 Kukdong Apt., 192 Garak-dong, Songpa-gu, Seoul (KR) 138-160; Il-hoing Shin, c/o Korea Advanced Institute of Science and Technology 373-1 Gueong-dong, Yusong-gu, Daejeon-city (KR) 305-338

( * ) Notice: Subject to any disclaimer, the term of this patent is extended or adjusted under 35 U.S.C. 154(b) by 687 days.

(21) Appl. No.: 10/359,300

(22) Filed: Feb. 6, 2003

(65) Prior Publication Data

US 2004/0022315 A1   Feb. 5, 2004

(30) Foreign Application Priority Data

May 3, 2002   (KR) ................................ 2002-24438

(51) Int. Cl.
   *H04B 1/66*     (2006.01)
   *H04N 7/12*     (2006.01)

(52) U.S. Cl. .................................................. 375/240.2

(58) Field of Classification Search ............ 375/240.29, 375/240.24, 240.2; 382/232, 275; H04N 7/12; H04B 1/66
   See application file for complete search history.

(56) References Cited

U.S. PATENT DOCUMENTS

| 5,475,434 | A  | * | 12/1995 | Kim ...................... 375/240.24 |
| 5,737,446 | A  | * | 4/1998  | Burns ......................... 382/232 |
| 6,539,060 | B1 | * | 3/2003  | Lee et al. ............... 375/240.29 |
| 6,912,255 | B1 | * | 6/2005  | Drezner et al. .......... 375/240.2 |
| 6,983,079 | B1 | * | 1/2006  | Kim ......................... 382/275 |
| 2003/0219074 | A1 | * | 11/2003 | Park et al. ............. 375/240.29 |

* cited by examiner

*Primary Examiner*—Tung Vo
(74) *Attorney, Agent, or Firm*—Sughrue Mion, PLLC

(57) ABSTRACT

Provided are a filtering method and apparatus for removing blocking artifacts and/or ringing noise. The filtering apparatus includes (a) performing one-dimensional discrete cosine transform (1D DCT) on video data on a block-by-block basis in a horizontal or vertical direction; (b) performing 1D DCT in the other direction of (a) and quantization on at least one of 1D DCT coefficients for a pixel obtained by performing 1D-DCT on the video data, the pixel being selected according to pixel position; and (c) generating filtering information based on the quantized pixel coefficient obtained from (b). According to the filtering method and apparatus, it is possible to reduce the amount of calculation when obtaining filtering information to remove the blocking artifacts and/or ringing noise.

30 Claims, 7 Drawing Sheets

FIG. 4A

| A | E | F | G |
|---|---|---|---|
| B | a | b | f |
| C | c | e | g |
| D | d | h | i |

1D DCT TRANSFORMED
4x4 BLOCK

→ 1D DCT / QUANTIZATION

FIG. 4B

| A | E | F | G |
|---|---|---|---|
| B | a | b | f |
| C | c | e | g |
| D | d | h | i |

FIG. 4C

| A | E | F | G |
|---|---|---|---|
| B | a | b | f |
| C | c | e | g |
| D | d | h | i |

FIG. 4D

| A | E | F | G |
|---|---|---|---|
| B | a | b | f |
| C | c | e | g |
| D | d | h | i |

FIG. 4E

| A | E | F | G |
|---|---|---|---|
| B | a | b | f |
| C | c | e | g |
| D | d | h | i |

FILTERING METHOD AND APPARATUS FOR REMOVING BLOCKING ARTIFACTS AND/OR RINGING NOISE

CROSS-REFERENCE TO RELATED APPLICATIONS

This application is based upon and claims priority from Korean Patent Application No. 2002-24438 filed May 3, 2002, the contents of which are incorporated herein by reference.

BACKGROUND OF THE INVENTION

1. Field of the Invention

The present invention relates to removing blocking artifacts and ringing noise, and more particularly, to a filtering method and an apparatus for removing blocking artifacts and ringing noise caused when processing a video frame on a block-by-block basis.

2. Description of the Related Art

In general, video data is encoded by processing video frames in block units. In particular, according to video data encoding standards such as moving picture experts group (MPEG) and H.263, video data is encoded by performing a discrete cosine transform (DCT) and quantization on video frames in block units. However, encoding video data in block units causes blocking artifacts and ringing noise in video frames. A video frame containing the blocking artifacts has boundaries between blocks of the video frame, which were not contained in the original video frame, thereby causing discontinuity between adjacent pixels. Also, in case of a video frame containing the ringing noise, a borderline of an object in the video frame is not smoothly depicted, e.g., the borderline may be irregular. The higher a compression rate of video data, the more serious the blocking artifacts and the ringing noise.

To filter the blocking artifacts and the ringing noise, it is important to first find an exact region of the video frame in which the blocking artifacts and/or ringing noise occur(s). If the exact region is not found, an edge region present in the original image frame may be mistakenly regarded as being generated due to the blocking artifacts and removed, thereby deteriorating the quality of the image.

Conventionally, an edge region of a reproduced pixel block is detected by measuring values such as the distributions of brightness, luminance, and color, of pixels on boundaries between 8×8 or 4×4 pixel blocks, and comparing the measured values with predetermined critical values. The critical values are experimentally obtained by measuring the distributions of the above pixel values, such as brightness, luminance, and color, and finding the relationship between the distributions and whether the edge region is present or not in an image frame.

To measure the distribution of pixel values, pixel values in a boundary region between adjacent blocks must be checked in the vertical or horizontal direction. However, in fact, the checking of every pixel value is almost impossible because of a large amount of calculation and complexity. In particular, calculation of pixel values in the vertical direction requires continuous memory access, which is out of the question.

SUMMARY OF THE INVENTION

To solve the above problems, it is a first object of the present invention to provide a filtering method and apparatus for effectively detecting an edge region in a pixel block.

It is a second object of the present invention to provide a filtering method and apparatus for effectively detecting an edge region in a pixel block, thereby reducing edge detection calculation.

To achieve one aspect of the above objects, there is provided a filtering method including (a) performing one-dimensional discrete cosine transform (1D DCT) on video data on a block-by-block basis in a horizontal or vertical direction; (b) performing 1D DCT in the other direction of (a) and quantization on at least one of 1D DCT coefficients for a pixel obtained by performing 1D-DCT on the video data, the pixel being selected according to pixel position; and (c) generating filtering information based on the quantized pixel coefficient obtained from (b).

Preferably, the pixel selected in (b) is at least one of a plurality of pixels, except for a DC component, on the uppermost line of the pixel block, and the filtering information generated in (c) is information regarding blocking artifacts occurring in the vertical direction of the pixel block.

The selected pixel is a pixel adjacent to the DC component and on the uppermost line of the pixel block. The filtering method further includes (c1) setting a vertical blocking flag (VBF) as the filtering information to be 1 when the quantized coefficient of the pixel selected in (b) has a predetermined value. (b) further comprises (b1) performing a 1D DCT and quantization, in the other direction of (a), on at least one pixel on the uppermost line of the pixel block, except for the DC component and the selected pixel, on the uppermost line of the pixel block, when the quantized coefficient of the pixel selected in (b) is not the predetermined value.

To achieve another aspect of the above objects, there is provided a filtering method including (a) performing 1D DCT on video data on a block-by-block basis in the horizontal or vertical direction; (b) performing 1D DCT in the other direction of (a) on at least one pixel selected according to pixel position from coefficients obtained by performing the 1D-DCT on the video data; (c) quantizing the coefficient of the selected pixel obtained in (b); (d) generating filtering information based on the quantized coefficient of the selected pixel quantized in (c); and (e) performing filtering on the video data based on the generated filtering information.

Preferably, the selected pixel is at least one of the pixels, except for a DC component, on the uppermost or leftmost line of the block.

More preferably, the selected pixel is a pixel adjacent to the DC component on the uppermost or leftmost line of the block. The filtering method further includes (b1) performing 1D DCT and quantization in the other direction of (a) on a 1D DCT coefficient of a pixel, except for the DC component and the selected pixel on the uppermost or leftmost line, among 1D DCT coefficients obtained by performing the 1D-DCT on the video data; (c1) quantizing the coefficient of the pixel transformed in (b1); and (d1) generating the filtering information based on the coefficient of the pixel quantized in (c1). The filtering information is information regarding the degree of blocking artifacts occurring in the horizontal or vertical direction of the block.

Preferably, the selected pixel is one of the pixels not on the uppermost and leftmost lines of the block, and the filtering information is information regarding the degree of ringing noise.

To achieve still another aspect of the above objects, there is provided a filtering apparatus including a filter information generator for performing 1D DCT on video data in block units in the horizontal or vertical direction, performing 1D DCT, in the other direction, and quantization on at least a coefficient for one pixel selected according to pixel position among coefficients obtained by the 1D DCT, and generating filtering information based on the quantized coefficient; a filter characteristic decision unit for determining filter characteristics based on the generated filtering information; and a loop filtering unit for performing deblocking filtering on the video data according to the determined filter characteristics.

Preferably, the selected pixel is at least one of the pixels, except for a DC component, on the uppermost line of the block, and the filtering information is information regarding blocking artifacts occurring in the vertical direction of the block.

BRIEF DESCRIPTION OF THE DRAWINGS

The above objects and advantages of the present invention will become more apparent by describing in detail preferred embodiments thereof with reference to the attached drawings in which:

FIGS. 4(a)–4(e) are views explaining another embodiment of a filtering method according to the present invention;

DETAILED DESCRIPTION OF THE INVENTION

In general, video data consists of a plurality of image frames. An image frame is encoded into either an intra frame or an inter frame and then transmitted. The intra frame is encoded with no reference to other images and can be independently decoded. On the other hand, the inter frame is encoded based on a previous image, that is, a difference between the inter frame and the frame of the previous image is encoded, and therefore, decoding of the inter frame requires the previous frame. Also, each image frame consists of a plurality of macro blocks, and each macro block contains a plurality of pixel blocks.

In a filtering method and apparatus according to the present invention, an edge region is detected by performing a discrete cosine transform (DCT) on each pixel value and checking the distribution of obtained transformed values and/or values by quantizing the transformed values. A filtering method and an encoding unit for performing such a method will now be described.

Figure 1:
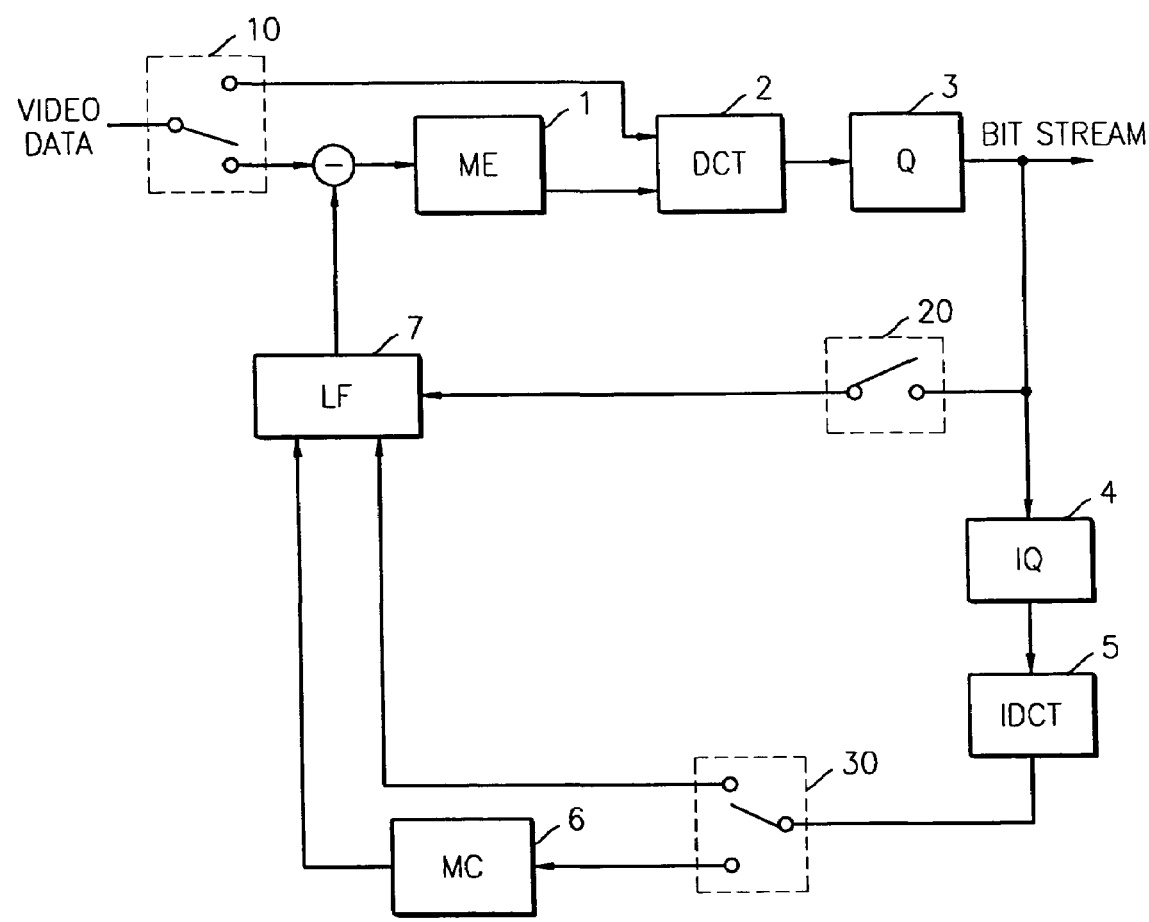
FIG. 1 is a block diagram of an encoding unit according to the present invention.

FIG. 1 is a block diagram of a preferred embodiment of an encoding unit according to the present invention. Referring to FIG. 1, the encoding unit includes a motion estimator (ME) 1, a discrete cosine transform (DCT) unit 2, a quantizer 3, an inverse quantizer 4, an inverse DCT (IDCT) unit 5, a motion compensator (MC) 6, and a loop filtering unit 7. The encoding unit further includes a controller (not shown) and first through third switches 10, 20, and 30 controlled by the controller.

Video data is input to the controller, the controller controls the first switch 10 such that an intra frame and an inter frame are input directly to the DCT unit 2 and the ME 1, respectively. The ME 1 compares a pixel value with a previous pixel value in pixel block units and outputs a difference between the pixel value and the previous pixel value, to the DCT unit 2. The DCT unit 2 transforms an image frame in case of the intra frame, and the difference in case of the inter frame. In other words, the DCT unit 2 performs a discrete cosine transform (DCT) on the pixel values of the intra frame and the difference. In this disclosure, the DCT is performed to transform video data frames but any applicable transform method such as a discrete wavelet transform (DWT) may be used instead of the DCT. The quantizer 3 quantizes the transformed values, i.e., DCT coefficients, according to a predetermined quantization step. The quantization step may be determined adaptively to the respective block unit. However, the larger the size of the quantization step, the more the noise due to quantization of values increases. Values, which are obtained by the DCT and quantization, are coded using variable-length coding (VLC), for example, and are transmitted to a receiving site.

Meanwhile, the values, which are obtained by the DCT and quantization, are input to the inverse quantizer 4 or the loop filtering unit 7. Also, the controller controls the second switch 20 to input intra frames to the loop filtering unit 7 and inter frames only to the inverse quantizer 4. More specifically, in the case of intra frames, the values output from the quantizer 3 are values required to detect an edge region, that is, values obtained by performing the DCT and quantization on pixel values in block units. Therefore, the intra frame values can be input directly to the loop filtering unit 7 without being additionally processed. In the case of inter frames, the values output from the quantizer 3 are values that are obtained by performing the DCT and quantization on differences between the inter frames and their previous frames. Thus, the inter frame values are input to the inverse quanatizer 4 to obtain values on which the DCT is performed and that is quantized, which is a process of restoring pixel values in block units.

The inverse quantizer 4 inversely quantizes the given pixel values according to a predetermined quantization step, and the IDCT unit 5 performs inverse discrete cosine transform (IDCT) on the inversely quantized values. However, in case that the DCT unit 2 adopts a transform method other than the DCT, the IDCT unit 5 performs the inverse transform based on the transform method, instead of the IDCT. For instance, if the DCT unit 2 is set to perform discrete wavelet transform (DWT), the IDCT unit 5 performs inverse DWT (IDWT) thereon. Intra frames output from the IDCT unit 5 are pixel values to be filtered, i.e., pixel values of a current image frame, and thus are input to the loop filtering unit 7. Inter frames need to be compensated for their motion so as to obtain pixel values for the current image frame, and thus are input to the motion compensator (MC) 6. Next, the controller controls the third switch 30 to input the intra frames output from the IDCT unit 5 to the loop filtering unit 7 and input the inter frames output from the IDCT unit 5 to the MC 6. Then, the MC 6 adds differences between the current image frames and a previous image frame to the previous image frame in block units, restores the current image frame, and outputs the result to the loop filtering unit (LF) 7.

The loop filtering unit 7 filters video frames according to the present invention. More particularly, the loop filtering unit 7 performs one-dimensional (1D) DCT on each block in the horizontal direction, sequentially performs the 1D DCT on pixels, which are selected according to pixel position, in the vertical direction, quantizes the 1D transformed pixels, and finally, performs filtering adaptively to the final result.

Figure 2A:
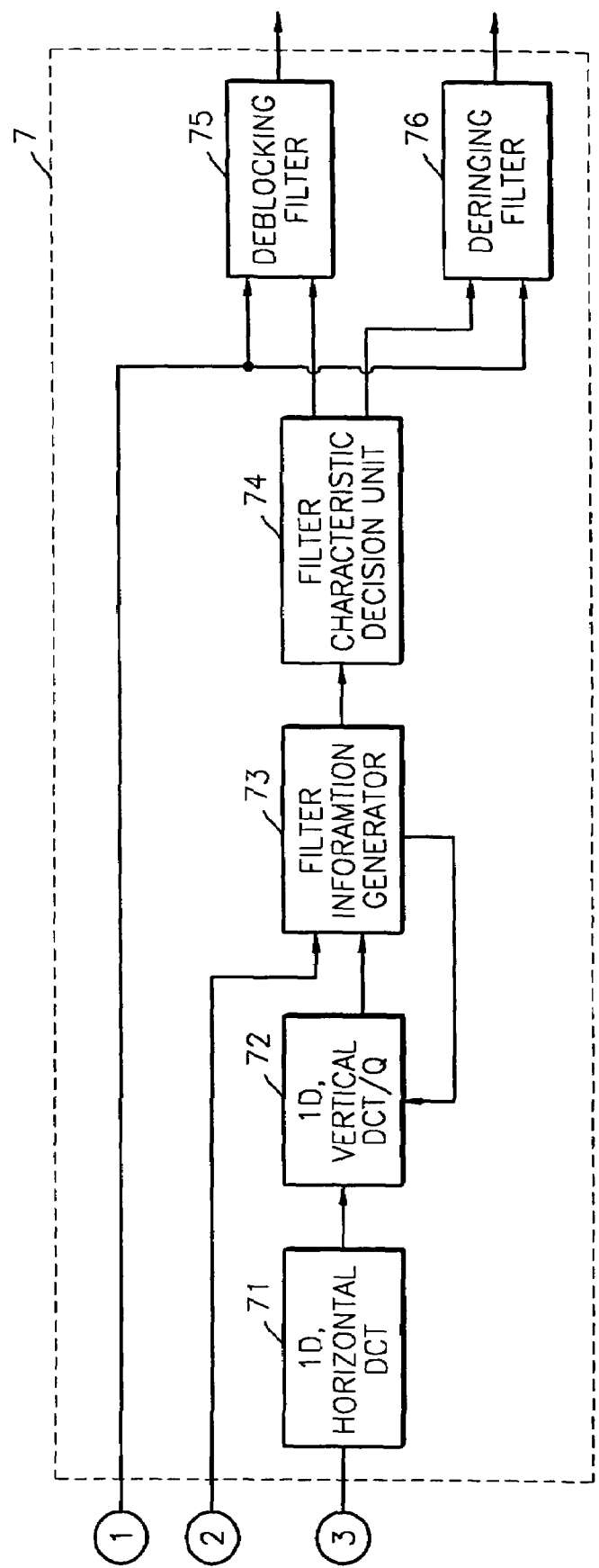
FIGS. 2A and 2B are block diagrams of embodiments of a loop filtering unit shown in FIG. 1.

FIG. 2A is a block diagram of a preferred embodiment of the loop filtering unit 7 of FIG. 1. Referring to FIG. 2A, the loop filtering unit 7 includes a one-dimensional (1D) horizontal loop DCT unit 71 (hereinafter, "1D horizontal DCT unit 71"); a 1D vertical DCT/quantizer 72 (hereinafter, "1D vertical DCT/Q 72"); a filtering information generator 73; a filter characteristics decision unit 74; a deblocking filter 75; and deringing filter 76.

There are two types of data input to the loop filtering unit 7: (i) object data to be filtered; and (ii) basic data to be used to create filtering information. In FIG. 2A, reference numeral ① denotes the object data, and reference numerals ② and ③ denote the basic data.

The object data contains pixel values in block units for an image frame. Object data for an intra frame is transmitted to the loop filtering unit 7 via the third switch 30, and object data for an inter frame is input from the MC 6 to the loop filtering unit 7.

In case of the basic data, pixel values of each block of an intra frame are DCT processed and quantized, and then transmitted directly to the loop filtering unit 7 via the second switch 20. On the other hand, pixel values in block units for an inter frame are input to the MC 6 to obtain values that are DCT processed and quantized. That is, pixel values of the inter frame must be transformed and quantized within the loop filtering unit 7. The pixel values input via the second switch 20, i.e., the pixel values of the intra frame among the basic data used to create filtering information, are input to the filtering information generator 73, and the pixel values output from the motion compensator 6, i.e., the pixel values of the inter frame in block units, are input to the 1D horizontal DCT unit 71.

The 1D, horizontal DCT unit 71 transforms and quantizes pixel values of the inter frame on a block-by-block basis. The 1D, horizontal DCT unit 71 and the 1D, vertical DCT/Q 72 have the same functions, i.e., transformation and quantization, as the DCT unit 2 and the quantizer 3 shown in FIG. 1. However, pixel values produced by the 1DC horizontal DCT unit 71 and the 1D vertical DCT/Q 72 are used to only detect the occurrence of the block artifacts. Therefore, the transformation and quantization of the 1D horizontal DCT unit 71 and the 1D, vertical DCT/Q 72 do not need the same precision as the DCT unit 2 and the quantizer 3 which transform and quantize video data so as to encode the video data.

The 1D vertical DCT/Q 72 performs the 1D, vertical DCT and quantization on some of the 1D DCT coefficients for pixels at certain positions, which are output from the 1D, horizontal DCT unit 71 after the 1D DCT.

The filtering information generator 73 checks if the quantized coefficients, which are produced by the 1D vertical DCT/Q 72, satisfy predetermined conditions. If the predetermined conditions are satisfied, the filtering information generator 73 creates filtering information such as a horizontal filtering flag HFF, a vertical filtering flag VFF, and a ringing flag RF. Otherwise, the filtering information generator 73 controls the 1D vertical DCT/Q 72 to perform the 1D vertical DCT and quantization on coefficients at other pixel positions. The predetermined conditions and generation of the filtering information will be later explained with reference to FIGS. 4 and 5.

The filter characteristic decision unit 74 determines and outputs filter characteristics based on the generated filtering information, and the deblocking filter 75 and the deringing filter 76 adaptively perform filtering on video data according to the determined filter characteristics.

Alternatively, in the DCT and quantization of the 1D, horizontal DCT unit 71 and the 1D, vertical DCT/Q 72, it is possible to lower precision in the DCT by using integer operation instead of decimal operation, increasing the quantization step size, or performing a FAST-mode DCT, thereby reducing the amount of calculation.

According to one aspect of the present invention, the 1D DCT unit 71 performs the DCT on video data one-dimensionally in the horizontal direction and the 1D vertical DCT/Q 72 perform the DCT on video data one-dimensionally in the vertical direction, respectively. However, this is not mandatory. For instance, the 1D horizontal DCT unit 71 and the 1D vertical DCT/Q 72 may perform DCT on video data one-dimensionally in the vertical direction and in the horizontal direction, respectively.

Figure 2B:
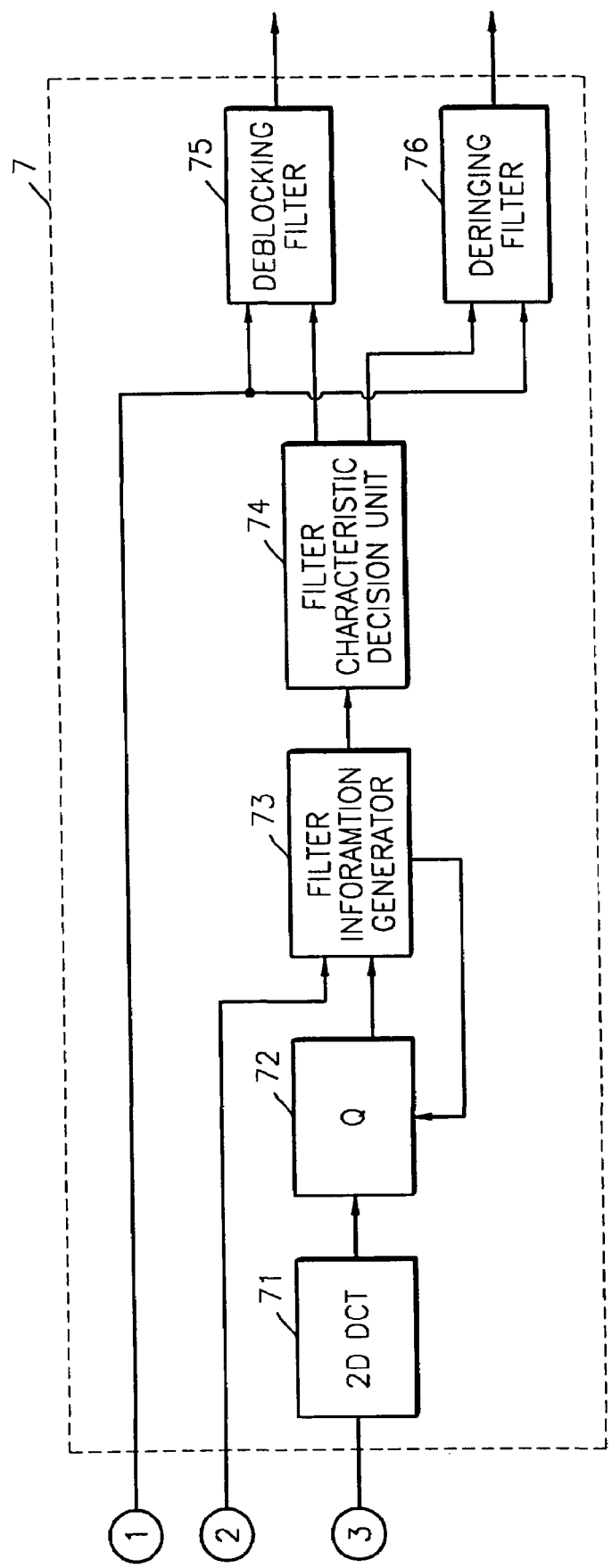

FIG. 2B is block diagram of another embodiment of the loop filtering unit 7 of FIG. 1. Referring to FIG. 2B, a two-dimensional (2D) DCT unit 71 and a quantizer 72 perform 2D DCT and quantization on coefficients at certain pixel positions of input video data. Except for the 2D DCT unit 71 and the quantizer 72, the elements shown in FIG. 2B are the same as those in FIG. 2A and thus their detailed descriptions will be omitted here.

The filtering information generator 73 checks if quantized coefficients, which are produced by the quantizer 72, satisfy predetermined conditions. If the quantized coefficients satisfy the predetermined conditions, the filtering information generator 73 creates filtering information such as a horizontal filtering flag HFF, a vertical filtering flag VFF, and a ringing flag RF. If the quantized coefficients do not satisfy the predetermined conditions, the filtering information generator 73 controls the 2D DCT unit 71 and the quantizer 72 to perform 2D DCT and quantization on coefficients at another position of the input video data.

Figure 3:
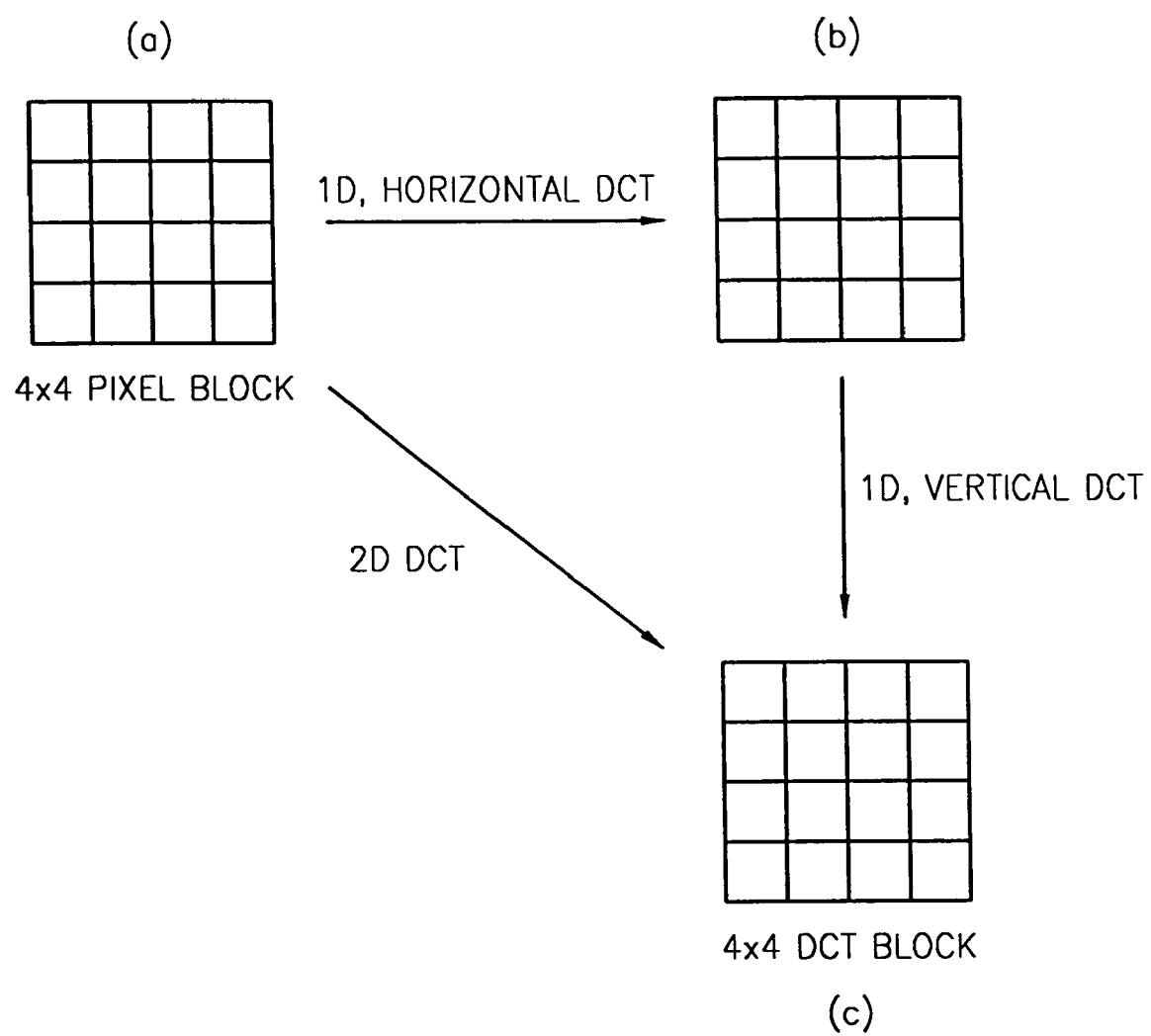
FIG. 3 is a view explaining one embodiment of a filtering method according to the present invention.

FIG. 3 is a view illustrating the present invention that 2D DCT may be achieved by carrying out 1D vertical DCT and 1D horizontal DCT according to the separability of DCT. Referring to FIG. 3, the 1D horizontal DCT is performed on a basic unit, i.e., a 4×4 pixel block (a), to obtain a 4×4 1D horizontal DCT transformed block (b), and the 1D vertical DCT is performed on the 1D horizontal DCT transformed block (b) to obtain a 2D DCT transformed block (c). The 2D DCT transformed block (c) is the same as obtained by performing the 2D DCT directly on the 4×4 pixel block (a).

FIG. 4 is a view illustrating a filtering method according to one embodiment of the present invention, the filtering method for reducing the amount of calculation carried out when filtering information is generated by the loop filtering unit 7, using the separability of DCT.

More specifically, referring to FIG. 4, FIG. 4(a) is a 4×4 pixel block on which the 1D, horizontal DCT is performed, and which corresponds to the DCT block (b) of FIG. 3. FIG. 4(b) is the 4×4 pixel block on which the 1D vertical DCT and quantization are performed only on a pixel A, that is, a DC component, of the 4×4 block.

FIG. 4(c) is the 4×4 pixel block on which the 1D vertical DCT and quantization are performed only on a pixel B, which is adjacent to the DC component, i.e., pixel A, on the leftmost line of the block. In (c), the arrow means that the 1D vertical DCT and quantization may be performed on pixels C and D, if necessary.

FIG. 4(d) is the 4×4 pixel block on which the 1D vertical DCT and quantization are performed only on a pixel E, which is adjacent to the DC component, i.e., pixel A, on the uppermost line. Likewise, the 1D vertical DCT and quantization may be performed on pixels F and G, if necessary.

FIG. 4(e) is the 4×4 pixel block (a) on which the 1D vertical DCT and quantization are performed only on the other pixel a, which is adjacent to the DC component, i.e., pixel A, and not on the pixels on the uppermost and leftmost lines of the block. If necessary, the 1D vertical DCT and quantization may be also performed on pixels b, c, d, and the others.

Here, A of the DCT block is a DC component. B, C, and D, which constitute the leftmost line of the DCT block, except for the DC component A, indicate whether or not an edge region is present in the horizontal direction of the 4×4 pixel block. E, F, and G, which constitute the uppermost line of the DCT block, except for the DC component A, indicate whether or not an edge region is present in the vertical direction of the 4×4 pixel block. Also, a through i, which constitute the DCT block, except for the leftmost and uppermost lines of the DCT block, indicate the occurrence of ringing noise wherein an object having an edge region is present in all directions of the 4×4 pixel block.

Hereinafter, a filtering method according to the present invention will be described with reference to FIGS. 4, 5 and 6.

Figure 5:
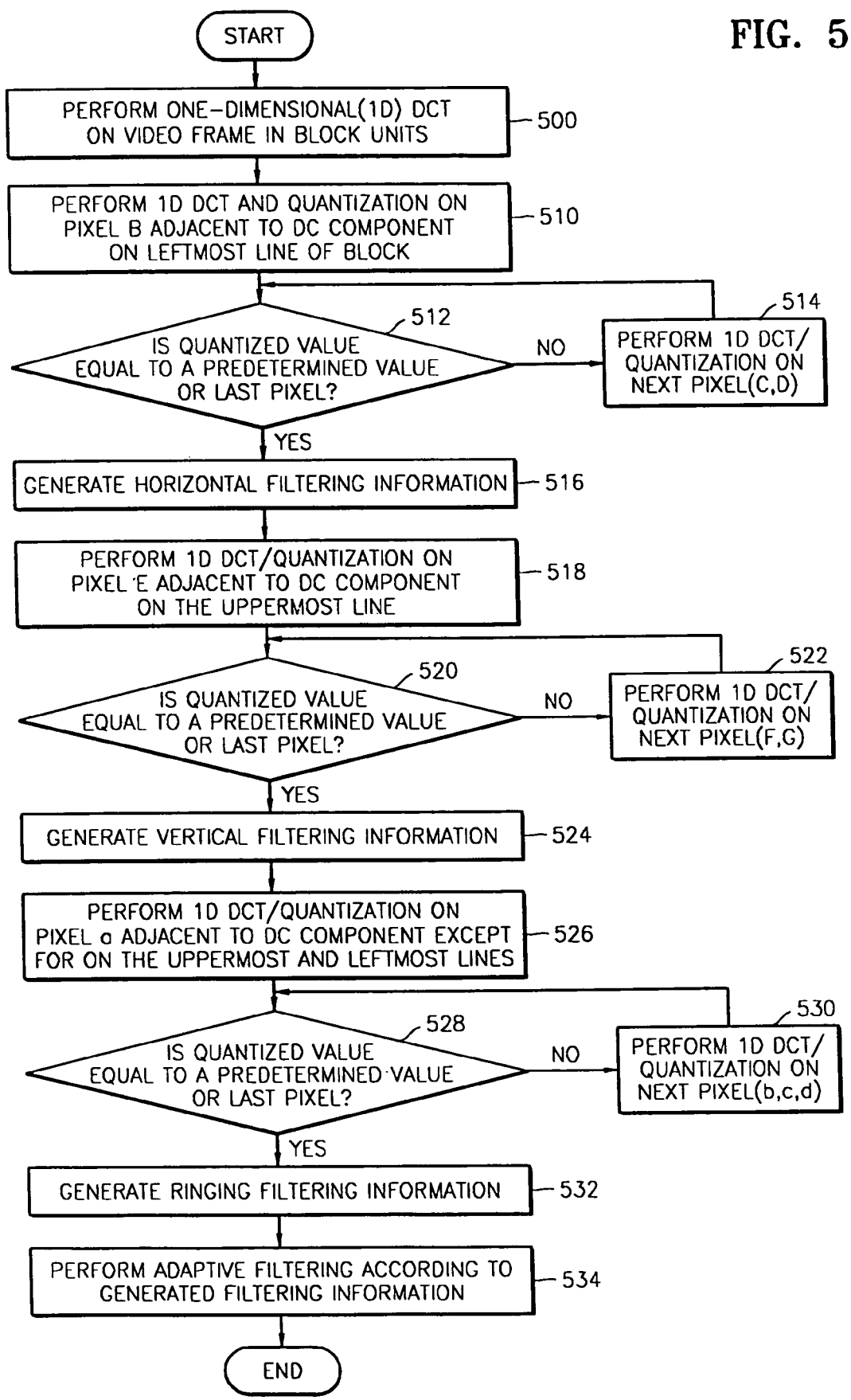
FIG. 5 is a flowchart explaining one embodiment of a filtering method according to the present invention.

FIG. 5 is a flowchart illustrating one embodiment of a filtering method according to the present invention. Referring to FIG. 5, one-dimensional (1D) DCT is performed on input video data for each block in the horizontal direction to calculate 1D horizontal DCT transformed coefficients, in step 500.

Next, in step 510, 1D vertical DCT is performed on a DCT coefficient for the pixel B, which is adjacent to the DC component at the leftmost line of the 4×4 pixel block, among the DCT coefficients calculated in step 500. The transformed DCT coefficient is quantized to calculate a quantized coefficient (see FIG. 4(c)).

In step 512, the quantized coefficient calculated in step 510 is checked. The process proceeds to step 514 if the quantized coefficient is 0, and proceeds to step 516 if the quantized coefficient is a predetermined value or the quantized pixel is the last pixel D at the leftmost line of the 4×4 pixel block.

In step 514, a 1D vertical DCT and quantization are performed on the next pixel at the leftmost line of the 4×4 pixel block, quantized coefficients are calculated, and the process proceeds to step 512 again.

In step 516, when the quantized coefficient checked last in the previous step 512 is a predetermined value other than 0, a horizontal blocking flag (HBF) as filtering information is set to be 1.

In step 518, 1D vertical DCT is performed on the pixel E adjacent to the DC component, i.e., the pixel A, at the uppermost line of the 4×4 pixel block, among the DCT coefficients calculated in step 500. Then, the transformed DCT coefficient is quantized to calculate a quantized coefficient (see FIG. 4(d)).

In step 520, the quantized coefficient calculated in step 518 is checked. If the quantized coefficient is 0, it proceeds to step 522, and if the quantized coefficient is a predetermined value rather than 0 or the quantized pixel is the last pixel G at the uppermost line of the 4×4 pixel block, it proceeds to step 524.

In step 522, a 1D vertical DCT and quantization are performed on the next pixel at the uppermost line of the 4×4 pixel block, quantized coefficients are calculated, and it proceeds to step 520 again.

In step 524, if the quantized coefficient checked last in step 520 is a predetermined value rather than 0, a vertical blocking flag VBF as filtering information is set to be 1.

In step 526, a 1D vertical DCT is performed on the pixel a, which is one of the pixels adjacent to the DC component, which is not on the uppermost and leftmost lines, among the DCT coefficients calculated in step 500, and the transformed DCT coefficient is quantized to calculate a quantized coefficient (see FIG. 4(e)).

In step 528, the quantized coefficient calculated in step 526 is checked, and the process proceeds to step 530 if the quantized coefficient is 0, or proceeds to step 532 if the quantized coefficient is a predetermined value other than 0 or the quantized pixel is the last pixel i of the 4×4 pixel block.

In step 530, a 1D vertical DCT and quantization are performed on the next pixels b through i, quantized coefficients are calculated, and the process proceeds to step 528.

In step 532, if the quantized coefficient calculated in step 528 is a predetermined value other than 0, a ringing flag RF as filtering information is set to be 1.

Next, in step 534, an encoding unit determines filter characteristics based on the produced filtering information and performs filtering on the input video data.

Alternatively, the filtering method shown in FIG. 5 further includes performing a 1D vertical DCT and quantization on the DC component of the block, on which the 1D, horizontal DCT is performed, and calculating a quantized coefficient of the DC component.

In steps 510, 518, and 526 shown in FIG. 5, a 1D vertical DCT and quantization are first performed on a pixel adjacent to the DC component among a plurality of pixels, except for the DC component, on the leftmost line of the block; a plurality of pixels, except for the DC component, on the uppermost line of the block; and a plurality of pixels except for the pixels on the leftmost and uppermost lines. However, the 1D vertical DCT and quantization may be first performed on one of groups of a plurality of pixels.

Alternatively, 2D DCT and quantization may be performed directly on a pixel selected according to a pixel position without performing the 1D horizontal DCT for 4×4 pixel block and quantization in step 500 of FIG. 5, thereby reducing the amount of calculation when generating filtering information.

The quantization in the filtering method illustrated in FIG. 5 does not need the same precision as when encoding video data, and thus may be accomplished using a simplified quantizer as follows:

LEVEL=$(K \times A(QP)+f \times 2^{20})/2^{20}$, wherein LEVEL denotes a quantized coefficient, K denotes a DCT transformed coefficient on which quantization is performed, A(QP) denotes a constant value according to a mapping table, and f is a constant determined depending on a target compression efficiency.

According to one aspect of the present invention, the quantized coefficient is set to 0 if $K<(2^{20}-f \times 2^{20})/A(QP)$ and is set to a predetermined value otherwise.

Alternatively, quantization performed during encoding of video data may be used.

As described above, in a filtering method according to the present invention, 1D DCT and quantization are first performed on the coefficients of pixels, which are selected according to pixel position, among DCT coefficients of a block on which 1D DCT is performed. For instance, when a quantization value for the pixel B on the leftmost line of the block is a predetermined value in step 512, the 1D DCT and quantization are not performed on the other pixels C and D on the leftmost line, and the HBF is determined to be 1. Therefore, the amount of calculation required to obtain filtering information is considered as being reduced compared to a conventional filtering method.

According to one embodiment of the present invention, in steps 516, 524, and 532, the degree of the blocking artifacts is checked with the quantized coefficients which are obtained by the filtering method of FIG. 5, and filtering information is generated as mentioned below.

When a quantized coefficient of one of the pixels, except for the DC component, on the uppermost line of the pixel block has a predetermined value, the pixel block reproduced in a receiving device has a similar value with a pixel in the vertical direction. This means that an edge region is likely present in the horizontal direction of the pixel block but is seldom present in the vertical direction thereof. Thus, in the event that an edge region is detected in the vertical direction of the reproduced pixel block, it can be considered as being due to the blocking artifacts. In this case, a vertical blocking flag (VBF) as filtering information is set to be 1.

When a quantized coefficient of one of pixels, except for the DC component, on the leftmost line has a predetermined value, the pixel block reproduced at a receiving site has a similar value with a pixel in the horizontal direction. That is, an edge region is likely present in the vertical direction of the pixel block but is seldom present in the horizontal direction thereof. For this reason, if an edge region is in the horizontal direction of the reproduced pixel block, it can be regarded as being due to the blocking artifacts. In this case, a horizontal blocking flag (HBF) as filtering information is set to be 1.

When a quantized coefficient of a pixel not on the leftmost and uppermost lines, has a predetermined value, it means ringing noise occurs in the pixel block. In this case, a ringing flag (RF) as filtering information is set to be 1.

If all of the quantized coefficients of the selected pixels described above, except for the DC component, are 0 and only a quantized coefficient of the DC component has a predetermined value, all of the pixel values of the pixel block reproduced in the receiving device, have the same values. In this case, there is little possibility that an edge region is present both in the vertical and horizontal directions of the pixel block. There is a higher probability that it is due to the blocking artifacts if an edge region is present in the pixel block. Therefore, both of the horizontal blocking flag (HBF) and vertical blocking flag (VBF) as filtering information are set to be 1.

Figure 6:
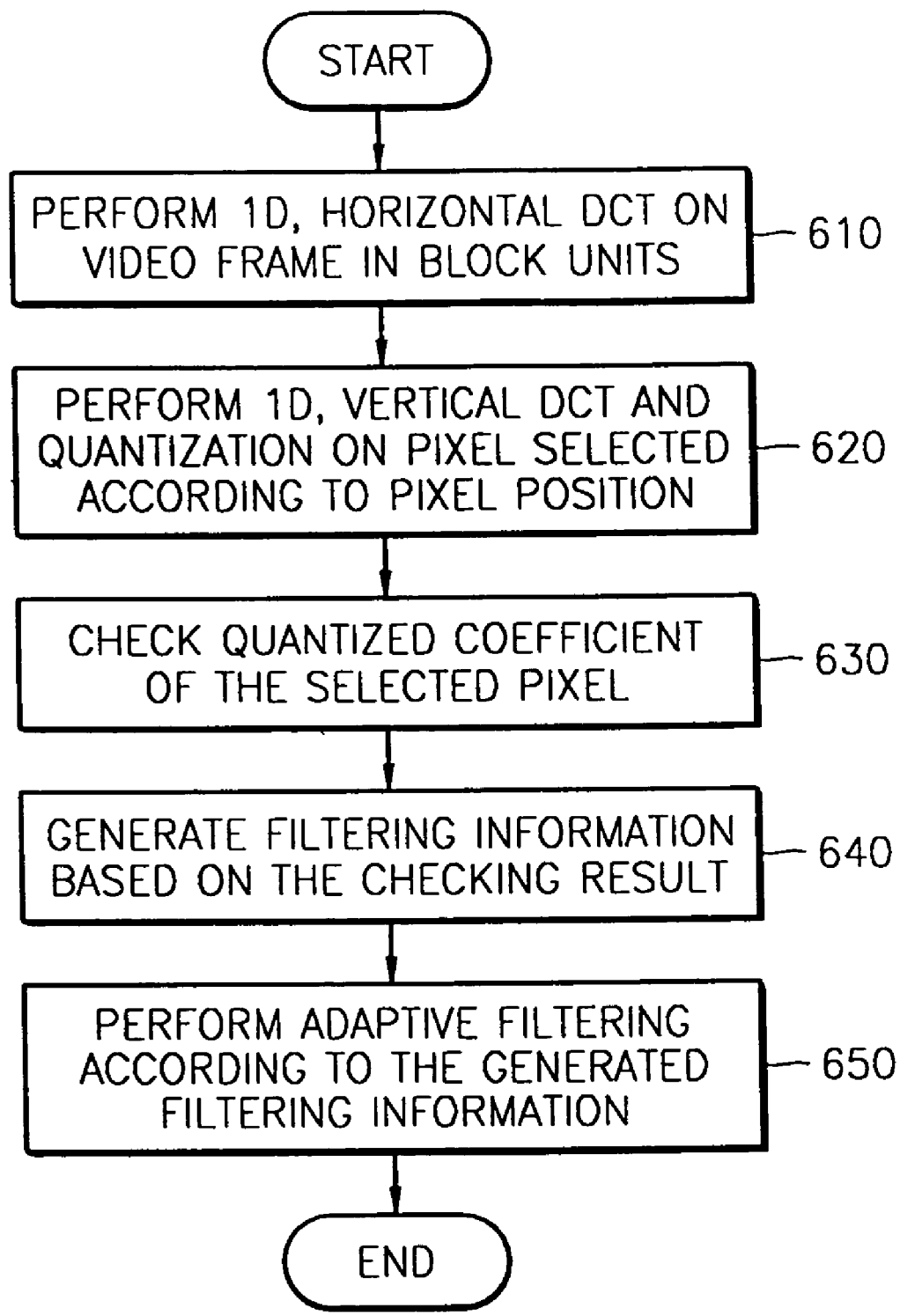
FIG. 6 is a flowchart explaining another embodiment of a filtering method according to the present invention.

FIG. 6 is a flowchart illustrating another embodiment of a filtering method according to the present invention. Referring to FIG. 6, 1D horizontal DCT is performed on a block-by-block basis in step 610, and 1D vertical DCT and quantization are performed on a pixel selected according to pixel position in step 620.

Next, in step 630, a quantized coefficient of the selected pixel is checked and the process proceeds to step 640 if the quantized coefficient is in conformance with predetermined conditions. In step 640, filtering information is generated based on the checking result. Thereafter, filtering is adaptively performed according to the generated filtering information in step 650.

Here, the predetermined conditions are that the process proceeds to step 640 if a quantized coefficient is a predetermined value other than 0 or a previous pixel, which is selected and quantized, is the last pixel at the leftmost and uppermost line of the block or the last pixel of the block.

Meanwhile, a filtering method and apparatus according to the present invention are implemented with a loop filtering unit included in an encoding unit but may be implemented with a post filter included in a decoding unit. Otherwise, the filtering method and apparatus according to the present invention may be accomplished by a loop filtering unit included in a decoding unit consisting of the inverse quantizer 4, the I DCT unit 5, the third switch 30, the motion compensator 6, the loop filtering unit 7, and the second switch 20, as described above.

While this invention has been particularly shown and described with reference to preferred embodiments thereof, it will be understood by those skilled in the art that various changes in form and details may be made therein without departing from the spirit and scope of the invention as defined by the appended claims.

As described above, with a filtering method and apparatus according to the present invention, it is possible to efficiently obtain filtering information to remove blocking artifacts and/or ringing noise in video data. Accordingly, the amount of calculation is still less than in a conventional filtering method and apparatus.

What is claimed is:

1. A filtering method comprising:
(a) performing one-dimensional discrete cosine transform (1D DCT) on video data on a block-by-block basis in a horizontal or vertical direction;
(b) performing 1D DCT in the other direction of (a) and quantization on at least one of 1D DCT coefficients for a pixel obtained by performing 1D-DCT on the video data, the pixel being selected according to pixel position; and
(c) generating filtering information based on the quantized pixel coefficient obtained from (b).

2. The filtering method of claim 1, wherein the pixel selected in (b) is at least one of a plurality of pixels, except for a DC component, on the uppermost line of a pixel block, and the filtering information generated in (c) is information regarding blocking artifacts occurring in the vertical direction of the pixel block.

3. The filtering method of claim 2, wherein the selected pixel is a pixel adjacent to the DC component and on the uppermost line of the pixel block.

4. The filtering method of claim 2, further comprising (c1) setting a vertical blocking flag (VBF) as the filtering information to be 1 when the quantized coefficient of the pixel selected in (b) has a predetermined value.

5. The filtering method of claim 1, wherein (b) comprises (b1) performing a 1D DCT and quantization, in the other direction of (a), on at least one pixel on the uppermost line of a pixel block, except for the DC component and the selected pixel, when the quantized coefficient of the pixel selected in (b) is not a predetermined value.

6. The filtering method of claim 1, wherein the pixel selected in (b) is at least one pixel, except for the DC component, on the leftmost line of a pixel block, and the filtering information generated in (c) is information regarding blocking artifacts occurring in the horizontal direction of the pixel block.

7. The filtering method of claim 6, wherein the selected pixel is adjacent to the DC component on the leftmost line of the pixel block.

8. The filtering method of claim 6, further comprising (c1) setting a horizontal blocking flag (HBF) as the filter information to be 1, when the quantized coefficient of the pixel selected in (b) is a predetermined value.

9. The filtering method of claim 6, wherein (b) further comprises (b2) performing 1D DCT and quantization, in the opposite direction of (a), on at least one of the pixels, except for the DC component and the selected pixel, on the leftmost line of the pixel block, when the quantized value of the pixel selected in (b) is not a predetermined value.

10. The filtering method of claim 1, wherein the pixel selected in (b) is at least one of pixels not on the uppermost and leftmost lines of the pixel block, and the filtering information generated in (c) is information regarding ringing noise.

11. The filtering method of claim 10 further comprising (c1) setting a ringing flag (RF) as the filtering information to be 1 if the quantized coefficient of the pixel selected in (b) is a predetermined value.

12. The filtering method of claim 1, wherein (b) further comprises (b3) performing 1D DCT and quantization, in the opposite direction in (a), on at least one pixel, except for the selected pixel, when the quantized coefficient of the pixel selected in (b) is not a predetermined value.

13. A filtering method comprising:
(a) performing 1D DCT on video data on a block-by-block basis in the horizontal or vertical direction;
(b) performing 1D DCT in the other direction of (a) on at least one pixel selected according to pixel position from coefficients obtained by performing the 1D-DCT on the video data;
(c) quantizing the coefficient of the selected pixel obtained in (b);
(d) generating filtering information based on the quantized coefficient of the selected pixel quantized in (c); and
(e) performing filtering on the video data based on the generated filtering information.

14. The filtering method of claim 13, wherein the selected pixel is at least one of the pixels, except for a DC component, on the uppermost or leftmost line of a block.

15. The filtering method of claim 13, wherein the selected pixel is a pixel adjacent to the DC component on the uppermost or leftmost line of the block.

16. The filtering method of claim 15, further comprising:
(b1) performing 1D DCT and quantization in the other direction of (a) on a 1D DCT coefficient of a pixel, except for the DC component and the selected pixel on the uppermost or leftmost line, among 1D DCT coefficients obtained by performing the 1D-DCT on the video data;
(c1) quantizing the coefficient of the pixel transformed in (b1); and
(d1) generating the filtering information based on the coefficient of the pixel quantized in (c1).

17. The filtering method of claim 13, wherein the filtering information is information regarding the degree of blocking artifacts occurring in the horizontal or vertical direction of the block.

18. The filtering method of claim 13, wherein the selected pixel is one of the pixels not on the uppermost and leftmost lines of the block.

19. The filtering method of claim 18, wherein the filtering information is information regarding the degree of ringing noise.

20. A method of encoding video data, comprising the filtering method of claim 1.

21. A method of encoding video data, comprising the filtering method of claim 13.

22. A method of decoding video data, comprising the filtering method of claim 1.

23. A method of decoding video data, comprising the filtering method of claim 13.

24. A filtering apparatus comprising:
a filter information generator for performing 1D DCT on video data in block units in the horizontal or vertical direction, performing 1D DCT, in the other direction, and quantization on at least a coefficient for one pixel selected according to pixel position among coefficients obtained by the 1D DCT, and generating filtering information based on the quantized coefficient;
a filter characteristic decision unit for determining filter characteristics based on the generated filtering information; and
a loop filtering unit for performing deblocking filtering on the video data according to the determined filter characteristics.

25. The filtering apparatus of claim 24, wherein the loop filtering unit comprises:
a loop transformer for transforming pixel values of an inter frame in block units; and
a loop quantizer for quantizing the pixel values transformed by the loop transformer.

26. The filtering apparatus of claim 24, wherein the selected pixel is at least one of the pixels, except for a DC component, on the uppermost line of a block, and the filtering information is information regarding blocking artifacts occurring in the vertical direction of the block.

27. The filtering apparatus of claim 24, wherein the selected pixel is at least one of the pixels, except for the DC component, on the leftmost line of the block, and the filtering information is information regarding blocking artifacts occurring in the horizontal direction of the block.

28. The filtering apparatus of claim 24, wherein the selected pixel is at least one of the pixels, except for on the uppermost and leftmost lines of the block, and the filtering information is information regarding ringing noise.

29. An apparatus for encoding video data, the apparatus comprising a filtering apparatus as described in claim 24.

30. An apparatus for decoding video data, the apparatus comprising a filtering apparatus as described in claim 24.

* * * * *